US012565023B2

(12) United States Patent (10) Patent No.: US 12,565,023 B2
Streuber (45) Date of Patent: Mar. 3, 2026

(54) LAYERED COMPOSITE COMPRISING A FIRE-RETARDANT COMPOSITE MATERIAL

(71) Applicant: 3D | Core GmbH & Co. KG, Herford (DE)

(72) Inventor: Fritz M. Streuber, Herford (DE)

(73) Assignee: 3D | COREGMBH & CO. KG, Herford (DE)

( * ) Notice: Subject to any disclaimer, the term of this patent is extended or adjusted under 35 U.S.C. 154(b) by 0 days.

(21) Appl. No.: 18/378,890

(22) Filed: Oct. 11, 2023

(65) Prior Publication Data

US 2024/0116264 A1 Apr. 11, 2024

(30) Foreign Application Priority Data

Oct. 11, 2022 (EP) .................................... 22200892

(51) Int. Cl.
  B32B 5/24 (2006.01)
  B32B 27/38 (2006.01)
(52) U.S. Cl.
  CPC .............. B32B 5/245 (2013.01); B32B 27/38 (2013.01); B32B 2264/101 (2013.01); B32B 2264/1025 (2020.08); B32B 2264/107 (2013.01); B32B 2264/2032 (2020.08); B32B 2264/302 (2020.08); B32B 2305/022 (2013.01); B32B 2305/18 (2013.01); B32B 2305/30 (2013.01); B32B 2307/3065 (2013.01); B32B 2307/72 (2013.01); B32B 2307/7376 (2023.05)
(58) Field of Classification Search
  None
  See application file for complete search history.

(56) References Cited

U.S. PATENT DOCUMENTS

| 10,669,400 B1 * | 6/2020 | Harvey | ................ C08G 59/063 |
| 2008/0167412 A1 * | 7/2008 | Elgimiabi | .............. C09K 21/02 |
| | | | 524/436 |

(Continued)

FOREIGN PATENT DOCUMENTS

| CA | 3 026 980 A1 | 12/2016 |
| GB | 2145969 A | 4/1985 |
| WO | 2022132297 A1 | 6/2022 |

OTHER PUBLICATIONS

European Search Report issued in European Patent Application No. 22 20 0892, mailed Mar. 29, 2023, 5 pages.

(Continued)

*Primary Examiner* — Chinessa T. Golden
(74) *Attorney, Agent, or Firm* — Buchanan Ingersoll & Rooney PC

(57) ABSTRACT

A layered composite includes: a foam core made of a plastic foam; and a first cover layer and a second cover layer, between which the foam core is arranged, wherein at least one of the cover layers is a fiber material layer containing reinforcement fibers embedded in plastic. A plastic resin fills intermediate spaces between the cover layers in and around the foam core and holds the cover layers and the foam core together. The layered composite includes a fire protection layer made of a composite material on a side of the fiber material layer facing away from the foam core. The composite material contains hollow micro-bodies made of ceramics or glass in a plastic material.

19 Claims, 2 Drawing Sheets

(56) References Cited

U.S. PATENT DOCUMENTS

| | | | |
|---|---|---|---|
| 2011/0092622 A1* | 4/2011 | Kaneda .................. | C09K 21/12 |
| | | | 524/100 |
| 2017/0022704 A1* | 1/2017 | Bertucelli ............... | E04B 1/942 |
| 2022/0032577 A1* | 2/2022 | Begg ..................... | B29C 51/421 |

OTHER PUBLICATIONS

Office Action issued Oct. 30, 2024, by the Canadian Intellectual Property Office in corresponding Canadian Patent Application No. 3,215,932. (4 pages).

* cited by examiner

LAYERED COMPOSITE COMPRISING A FIRE-RETARDANT COMPOSITE MATERIAL

CROSS REFERENCE TO RELATED APPLICATIONS

This application claims benefit of priority from European Patent Application No. 22 200 892.2, filed Oct. 11, 2022. The contents of this application are incorporated herein by reference.

BACKGROUND OF THE INVENTION

The invention relates to a layered composite comprising multiple material layers including a fire protection layer made of a composite material. The layered composite can be provided as a panel structure or a two-dimensionally or three-dimensionally curved shell structure. The layered composite can in particular be a lightweight vehicle structure. The layered composite can be used as a lightweight structure for land vehicles, watercraft and aircraft and also for spacecraft. It is preferably used in commercial vehicles, rail vehicles, airplanes and in boat and ship building. The layered composite is suitable for use as an exterior structure and an interior structure of a vehicle. It can advantageously form a front mask of a vehicle or a floor structure of a vehicle, for example a floor panel, or a vehicle tank or a sub-region of a vehicle tank, for example an airplane tank. Partition walls and bulkheads are other example applications.

FIELD OF THE INVENTION

In weight-optimized lightweight construction, it is increasingly necessary to counter the risk of fire, wherein the requirement for sufficient fire protection is in opposition to the constant demand for weight reduction. Application-specific provisions with regard to fire protection have to be met, for example DIN ISO 45545 for rail vehicles or the IMO 2010 FTP code and/or the International Convention for the Safety of Life at Sea (SOLAS) for maritime applications and their implementation in national regulations.

Static and/or dynamic mechanical requirements, for example in terms of strength, typically result in a laminate plan which describes the individual layers or plies of the layered composite of the respective lightweight structure. The layered composite typically comprises a base foam core and fiber material cover layers. The foam core and cover layers are impregnated with a fire protection resin. This laminate structure is usually coated with a fire protection coating, a so-called intumescent layer, which forms an insulating layer. When exposed to heat, the intumescent layer foams and forms a lightweight insulation layer as a heat barrier. Graphite which expands in the course of this process, for example so-called exfoliated graphite, releases gases when exposed to heat and forms an ashing, carbonaceous insulating layer when combusted. The insulating layer hinders the supply of oxygen and therefore the spread of flames into the layered composite.

In view of these high requirements, the fire-retardant properties are in many cases not met because the insulation effect of the intumescent layer is not sufficient and the thermal conductivity of the resin in the layered composite is too high. This leads to impermissible spread of flames and the layered composite catching fire. In practice, therefore, other fiber material cover layers impregnated with fire protection resin are added in addition to the cover layers required for strength. Due to its greater mass, this many-layered structure prevents heat from quickly penetrating into the core of the lightweight structure and thus prevents the flammable component parts from catching fire. It is however a problem of the additional cover layers that they lead to a significant increase in weight. The respective structure then meets the fire protection requirements, but no longer meets the weight requirements made of the original lightweight component. Conventional fire protection not only increases the weight but, by association, also the price of the structure.

SUMMARY OF THE INVENTION

An aspect on the invention is a layered composite which affords good fire protection while still exhibiting a low specific weight which is suitable for lightweight construction.

The subject of an aspect of the invention is a layered composite which comprises a foam core made of a plastic foam, a first cover layer and a second cover layer between which the foam core is arranged, and a plastic resin which fills the intermediate spaces between the cover layers in the region of the foam core and holds the cover layers and the foam core together. The foam core can be structured such that it is two-dimensionally or preferably three-dimensionally deformable. The foam core can then exhibit foam material islands arranged next to each other in both surface directions in a plan view, wherein any two adjacent foam material islands are separated from each other by an inter-jacent attenuation region and connected to each other by a foam material bridge each, such that they can be moved relative to each other and the foam core as a whole can be two-dimensionally or three-dimensionally deformed by shifting foam material islands relative to each other. The attenuation regions can in particular be breaches between the material islands which are bridged by the connecting material bridges.

The first cover layer and/or the second cover layer is/are (each) a fiber material layer containing reinforcement fibers embedded in plastic. The reinforcement fibers can advantageously form a textile sheet structure, for example a fiber fabric or a fiber scrim or a knitted fabric or a non-woven fabric. The respective fiber material layer can exhibit multiple textile sheet structures next to each other and/or in particular in multiple plies one above the other.

The layered composite also comprises a fire protection layer made of a composite material. The fire protection layer is provided on a side of the fiber material layer facing away from the foam core. If the first cover layer and second cover layer are each a fiber material layer, a fire protection layer made of the composite material is provided on the side, facing away from the foam core, of at least one of the fiber material layers. The fire protection layer can be provided directly on the side of the fiber material layer facing away from the foam core, i.e. it can immediately follow the fiber material layer in the layered composite. It is however also possible to arrange an intumescent layer as an intermediate layer between the fire protection layer and the fiber material layer below it, wherein said intermediate layer can immediately follow the fiber material layer and/or the fire protection layer can immediately follow the intermediate layer.

In accordance with an aspect of the invention, the composite material and accordingly the fire protection layer consisting of it contains hollow micro-bodies made of glass or ceramics in a plastic material. The hollow micro-bodies define cavities in the polymer phase, such that the composite material exhibits a lower specific density than the plastic material of the composite material. This provides a fire protection layer having a low density and accordingly a low specific weight.

In advantageous embodiments, the composite material and therefore the fire protection layer exhibits a density of at most 0.8 g/ccm (grams per cubic centimeter). More preferably, the composite material has a density of at most 0.6 g/ccm.

Where densities are specified, they relate to a pressure of 1.01325 bars and a temperature of 20° C. (laboratory conditions).

The plastic material of the composite material and therefore fire protection layer can be solely a polymer phase, with no additives, or a polymer phase provided with filler material and/or functional additives. The polymer phase of the composite material can be formed from a single polymer or multiple different polymers including copolymers and polymer blends. This polymer phase has a density of preferably at most 1.5 g/ccm or at most 1.4 g/ccm or more preferably at most 1.3 g/ccm. The polymer phase can conversely have a density of at least 0.7 g/ccm or at least 0.9 g/ccm.

The polymer phase can be provided with one or more different fire protection additives. In advantageous embodiments, the respective fire protection additive is selected according to its type and only added in a proportion by mass such that the upper limits mentioned with respect to the polymer phase also apply to the provided plastic material of the composite material, i.e. the provided plastic material including the fire protection additive and preferably also including any other additives has a density of at most 1.5 g/ccm or at most 1.4 g/ccm or more preferably at most 1.3 g/ccm.

The hollow micro-bodies can in particular be hollow spheres.

The hollow micro-bodies preferably have a density of at most 0.4 g/ccm or at most 0.3 g/ccm. Even more preferably, they have a density of at most 0.2 g/ccm. Such hollow micro-bodies are for example available from 3M Corp. (Saint Paul, Minnesota, USA). The hollow glass spheres K1, K11, K15, K20, K20HS, K25, K37, A16/500, A20/1000, H20/1000, S15 and S22 by 3M Corp. having average particle densities of between 0.10 g/ccm and 0.27 g/ccm are thus for example suitable as the hollow micro-bodies of the fire-retardant composite material.

It is desirable for the micro-hollow bodies to be pressure-resistant at pressures above 15 bars, preferably above 20 bars, and/or heat-resistant at ambient temperatures above 500° C., preferably above 700° C.

A proportion by mass of at least 80% of the hollow micro-bodies per unit volume of the fire protection layer can exhibit a size of at most 120 μm (micrometers) or at most 110 μm or at most 100 μm. If, as is preferred, the hollow micro-bodies are hollow micro-spheres, this means that 80% of the mass of the hollow micro-bodies per unit volume of the fire protection layer exhibit an outer diameter of at most 120 μm or at most 110 μm or at most 100 μm. If the hollow micro-bodies are not spheres, but rather for example hollow bodies which are elongated along a main axis, the upper limits for the size apply to the respectively largest outer extent of the hollow micro-bodies. Preferably, at least 90% by mass of the hollow micro-bodies per unit volume of the fire protection layer exhibit a size of at most 120 μm or at most 110 μm or at most 100 μm. Conversely, it is advantageous for a proportion by mass of the hollow micro-bodies of at least 80% to exhibit a size, for example a spherical diameter, of at least 20 μm or at least 30 μm. In preferred embodiments, the lower limit of 30 μm and in particular the lower limit of 20 μm applies to at least 90% by mass of the hollow micro-bodies. This percentage also relates to the overall mass of the hollow micro-bodies per unit volume of the fire protection layer.

It is conducive to lightweight construction for the proportion by volume of the hollow micro-bodies of the composite material to be at least as large as the proportion by volume of the plastic material of the composite material. The proportion by volume of the hollow micro-bodies can be at least 1.5 times as large or in particular at least twice as large as the proportion by volume of the plastic material. At least 50% by volume or at least 60% by volume or more preferably at least 70% by volume of the composite material or fire protection layer can consist of the hollow micro-bodies.

In the interests of lightweight construction, a resin material which has a density of at most 1.5 g/ccm or at most 1.3 g/ccm is used in advantageous embodiments as the plastic resin which holds the foam core and the cover layers together. The plastic resin can in particular be a duromer or a vitrimer or can contain a combination of the two.

It is advantageous for the composite material to have a lower density than the plastic resin which holds the foam core and the cover layers together. If the polymer phase of the composite material does not itself already exhibit a lower density than said plastic resin, the lower density of the composite material is achieved at least by the hollow micro-bodies.

One function of the foam core is to keep the first and second cover layers spaced from each other. The plastic foam which forms the foam core can have a very low density of at most 0.4 g/ccm or even only 0.2 g/ccm at most.

Due to the high specific thermal resistance of the composite material, effective fire protection is already achieved by a fire protection layer which is at most 2 mm (millimeters) or at most 1.5 mm thick. This also benefits a lightweight construction. Sufficient fire protection can also in particular be achieved even at such small protective layer thicknesses if at least 80% by mass or at least 90% by mass of the hollow micro-bodies are within the size range mentioned, i.e. between 20 μm and 120 μm or between 20 μm and 100 μm and more preferably between 20 μm and 100 μm. Conversely, it is advantageous for the fire protection layer to have a thickness of at least 0.6 mm or at least 1 mm.

The thermal conductivity coefficient A of the composite material of the fire protection layer is advantageously at most half or more preferably at most a third of the thermal conductivity coefficient exhibited by typical composite materials of fiber material cover layers. In advantageous embodiments, the thermal conductivity coefficient λ of the composite material of the fire protection layer is less than 0.6 W/(m·K) or less than 0.5 W/(m·K) and preferably less than 0.3 W/(m·K) or less than 0.2 W/(m·K). A thermal conductivity coefficient λ in the range of 0.1 W/(m·K) or 0.15 W/(m·K) to at most 0.5 W/(m·K) is preferred.

The proportion by volume of the plastic material of the composite material can be reduced to a minimum required for the fire protection layer to hold together. The hollow micro-bodies can advantageously be provided as the tightest packing, for example the tightest spherical packing, in the fire protection layer. They can directly abut each other. In advantageous embodiments, the plastic material fills only the inevitable cavities between the adjacent hollow micro-bodies.

The polymer phase of the composite material can in particular contain an epoxy resin and/or a vinyl ester resin and/or a saturated polyester resin and/or an epoxy vitrimer and/or a polyphenol resin or can be formed by one of these polymers or by a mixture of two or more of these polymers. Epoxy vitrimers, in particular bio-based epoxy vitrimers, and bio-based polyphenol resins, for example furan resins, are particularly suitable. The polymer phase of the composite material can also contain polymer components which differ in terms of their class of plastics, for example a duromeric and a plastomeric component, a duromeric and a vitrimeric component, a plastomeric and a vitrimeric component or a combination of all three different components, wherein at least one of the components can also be a bio-based polymer material, for example a polyphenol component or epoxy vitrimer component.

The composite material of the fire protection layer can be provided with one or more different fire protection additives in addition to the hollow micro-bodies. Possible fire protection additives include in particular phosphoric additives such as for example polyphosphates and/or ammonium phosphates and/or ammonium polyphosphates and/or melamine and/or melamine phosphates and/or melamine polyphosphates and/or DOPO phosphoramidates. If the polymer phase of the composite material is provided with one or more additional fire protection additives, the proportion of the one or more different fire protection additives constitutes at least 0.1% by mass and at most 20% by mass of the plastic material of the composite material as a whole, wherein the plastic material is understood to be the polymer phase and the optional additives together. Due to the hollow micro-bodies made of glass or fire-retardant ceramics, however, additional fire protection additives are not required and are also not provided in advantageous embodiments or can at least be reduced to a comparatively low level. This benefits the lightweight construction.

As already mentioned, the layered composite can additionally exhibit an intumescent layer as a gelcoat cover layer between the fire protection layer and the fiber material layer which is closest to the foam core, in order to generate additional protection against fire. Instead or additionally, an intumescent layer in the form of a gelcoat cover layer can be provided on a side of the fire protection layer facing away from the foam core, in order to generate additional fire protection.

The composite material is suitable not only for forming a fire protection layer outside the core layers, i.e. the foam core and the first and second cover layers, but also for lining the foam core. In this function, the fire-retardant composite material can fill recesses on the outer surface of the foam core, for example open pores and/or perforations, and/or other cavities which are optional in the region of the foam core, in order to reduce the resin absorption of the foam core and/or to protect the foam core from fire. Plastic foams exhibit open pores which become larger as the density decreases, above all in regions in which the foam core has been subsequently machined, for example in regions in which the foam core has been structured by means of a separating process such as for example cutting and/or sawing. During impregnation, the open pores are filled with the plastic resin of the inner resin matrix which connects the first and second cover layers, thus increasing the weight of the foam core or core composite consisting of the foam core and the first and second cover layers. The weight of the layered composite can be further reduced by covering or lining at least regions of the outside of the foam core with a surface layer made of the composite material which exhibits a lower density than the plastic resin of the inner resin matrix, not least because of its hollow micro-bodies.

Sealing cavities in the foam core with the composite material is not only advantageous in combination with the fire protection layer formed outside the core composite, but also separately helps to improve fire protection. Another advantageous layered composite is therefore one which exhibits Features 1.1 to 1.3 but not 1.4 and 1.5, in which at least regions of the foam core are instead lined with the composite material disclosed here, such that the composite material seals open pores in the plastic foam on the outer surface of the foam core, thereby preventing plastic resin of the inner resin matrix from penetrating into the foam core during impregnation, or at least reducing the amount of plastic resin entering.

The plastic material of the fire protection layer can be mixed with metal oxide particles, for example zinc oxide particles, in order to provide protection against electromagnetic interference pulses. If the plastic material contains metal oxide particles, they are at least 20 nm (nanometers) and at most 250 nm in size. A layered composite comprising a fire protection layer provided with these particles can for example form a wall structure of a housing for electronic components or wall structures of spaces for keeping electromagnetic interference pulses away from electronic devices arranged in said spaces.

Additionally or for the purpose of weight optimization, the hollow micro-bodies or at least some of the hollow micro-bodies of the composite material can be coated with metal, instead of the metal oxide particles, in order to obtain said protection against electromagnetic interference pulses in addition to fire protection. If hollow micro-bodies made of glass are used, the composite material and consequently the layered composite are suitable for manufacturing lightweight structures for shielding electronic transmitting and/or receiving systems, while protecting against catching fire, even without any additional measures such as for example a metal coating and/or metal oxide additives, due to the good dielectric properties of such hollow micro-bodies.

The layered composite can exhibit one or more other fire protection layer(s) on a side of the fire protection layer facing away from the foam core, in order to further improve fire protection while maintaining a low weight. The two or more fire protection layers in total can differ from the fire protection layer disclosed here in relation to their layer thickness and/or plastic material and/or hollow micro-bodies and/or mixing ratio. Conversely, the statements made with respect to the fire protection layer and its composite material apply similarly to any other fire protection layer.

In the interests of keeping the weight as low as possible, it is advantageous for the fire protection function to be concentrated on the fire protection layer and/or on lining cavities on the surface of the foam core with the composite material. Additionally, however, the plastic foam of the foam core and/or the plastic resin which holds the foam core and the cover layers together can in principle also be provided with one or more different fire protection additives.

The composite material disclosed in connection with the fire protection layer is also ideally suitable for use as a highly filled fire protection filler for filling cavities between lightweight structures arranged next to each other or one on top of the other or for filling cavities in a lightweight structure. The composite material can then for example be used to fill joins or to line the fillet region of two lightweight structures which together form an overlapping join, i.e. which lie one on top of the other in an overlap, such as a fillet seam, wherein the composite material can be used as a filler, in particular in combination with lightweight structures which exhibit a layered composite in accordance with an aspect of the invention, in order to close a gap in fire protection which might otherwise remain between adjacent lightweight structures or on a lightweight structure. The composite material is therefore also advantageous as such, i.e. as a filler or raw material for applying to panel-shaped or shell-shaped structures, in particular lightweight structures. Where features of the fire-retardant composite material are disclosed on the basis of the layered composite in accordance with an aspect of the invention, the relevant statements made also apply to the composite material as such, as an initial raw material for refining lightweight structures and/or as a filler.

Features of an aspect of the invention are also described in the aspects formulated below. The aspects are formulated in the manner of claims and can substitute for them. Features disclosed in the aspects can also supplement and/or qualify the claims, indicate alternatives with respect to individual features and/or broaden claim features. Bracketed reference signs relate to example embodiments of the invention illustrated below in figures. They do not restrict the features described in the aspects to their literal sense as such, but do conversely indicate preferred ways of implementing the respective feature.

Aspect 1. A layered composite, comprising:

1.1 a foam core (1) made of a plastic foam;

1.2 a first cover layer (7) and a second cover layer (8), between which the foam core (1) is arranged, wherein at least one of the cover layers (7, 8) is a fiber material layer (8) containing reinforcement fibers embedded in plastic, preferably in the form of one or more plies of a textile sheet structure;

1.3 a plastic resin (5) which fills intermediate spaces between the cover layers (7, 8) in and around the foam core (1) and holds the cover layers (7, 8) and the foam core (1) together; and 1.4 a fire protection layer (10) made of a composite material (11, 12) on a side of the fiber material layer (8) facing away from the foam core (1) and/or 1.5 a composite material (11, 12) which lines at least regions of the foam core (1), such that the composite material (11, 12) seals open pores in the plastic foam on the outer surface of the foam core (1), 1.6 wherein the composite material (11, 12) contains hollow micro-bodies (12) made of ceramics or glass in a plastic material (11).

Aspect 2. The layered composite according to the preceding aspect, wherein the composite material (11, 12) has a density of at most 0.8 g/ccm or at most 0.6 g/ccm.

Aspect 3. The layered composite according to any one of the preceding aspects, wherein at least 80% by mass of the plastic material (11) of the composite material (10) consists of a polymer phase having a density of at most 1.5 g/ccm or at most 1.3 g/ccm.

Aspect 4. The layered composite according to the preceding aspect, wherein the polymer phase (11) of the composite material (10) has a density of at least 0.7 g/ccm or at least 0.9 g/ccm.

Aspect 5. The layered composite according to any one of the preceding aspects, wherein the hollow micro-bodies (12) have a density of at most 0.4 g/ccm or at most 0.3 g/ccm.

Aspect 6. The layered composite according to any one of the preceding aspects, wherein a proportion by mass of at least 80% of the hollow micro-bodies (12) exhibits an outer extent of at most 120 µm or at most 100 µm.

Aspect 7. The layered composite according to any one of the preceding aspects, wherein a proportion by mass of at least 80% of the hollow micro-bodies (12) exhibits an outer extent of at least 20 µm or at least 30 µm.

Aspect 8. The layered composite according to any one of the preceding aspects, wherein a proportion by mass of at least 80% of the hollow micro-bodies (12) exhibits a greatest outer extent of at most 120 µm and at least 20 µm.

Aspect 9. The layered composite according to any one of the preceding aspects, wherein the proportion by volume of the hollow micro-bodies (12) of the composite material (10) is at least as large as the proportion by volume of the plastic material (11) of the composite material (10).

Aspect 10. The layered composite according to any one of the preceding aspects, wherein the proportion by volume of the hollow micro-bodies (12) of the composite material (10) is larger, preferably at least 1.5 times or at least twice as large as the proportion by volume of the plastic material (11) of the composite material (11, 12).

Aspect 11. The layered composite according to any one of the preceding aspects, wherein the composite material (11, 12) has a lower density than the plastic resin (5) which holds the foam core (1) and the cover layers (7, 8) together.

Aspect 12. The layered composite according to any one of the preceding aspects, wherein the plastic resin (5) which holds the foam core (1) and the fiber material layers (7, 8) together has a density of at most 1.5 g/ccm or at most 1.3 g/ccm.

Aspect 13. The layered composite according to any one of the preceding aspects, wherein the plastic foam of the foam core (1) has a density of at most 0.4 g/ccm or at most 0.2 g/ccm.

Aspect 14. The layered composite according to any one of the preceding aspects, wherein the fire protection layer (10) has a thickness of at most 2 mm or at most 1.5 mm.

Aspect 15. The layered composite according to any one of the preceding aspects, wherein the fire protection layer (10) has a thickness of at least 0.6 mm or at least 1 mm.

Aspect 16. The layered composite according to any one of the preceding aspects, wherein the hollow micro-bodies (12) are hollow spheres.

Aspect 17. The layered composite according to any one of the preceding aspects, wherein at least 80% by mass of the plastic material (11) of the composite material (10) consists of a polymer phase which is or contains an epoxy resin or a vinyl ester resin or a saturated polyester resin or an unsaturated polyester resin or a bio-based polyphenol resin, such as for example furan resin, or an epoxy vitrimer or a mixture of two or more of these polymers.

Aspect 18. The layered composite according to any one of the preceding aspects, wherein at least 80% by mass of the plastic material (11) of the composite material (10) consists of a polymer phase which contains or is a bio-based polymer material, preferably a bio-based polyphenol resin and/or a bio-based epoxy vitrimer.

Aspect 19. The layered composite according to any one of the preceding aspects, wherein at least 80% by mass of the plastic material (11) of the composite material (10) consists of a polymer phase which contains at least two different polymer components selected from a duromeric component, a plastomeric component and a vitrimeric component, wherein at least one of the components is preferably a bio-based polymer material, for example a polyphenol component or epoxy vitrimer component.

Aspect 20. The layered composite according to any one of the preceding aspects, wherein the plastic material (11) of the composite material (10) is provided with one or more different fire protection additives, for example polyphosphate and/or ammonium phosphate and/or ammonium polyphosphate and/or melamine and/or melamine phosphate and/or melamine polyphosphate and/or DOPO phosphonamidate.

Aspect 21. The layered composite according to any one of the preceding aspects, wherein a proportion by mass of at least 0.1% and at most 20% of the plastic material (11) of the composite material (10), relative to the mass of the plastic material (11) of the fire protection layer (10), contains fire protection additives.

Aspect 22. The layered composite according to any one of the preceding aspects, wherein the layered composite additionally exhibits an intumescent layer (15) as a gelcoat cover layer between the fiber material layer (8) and the fire protection layer (10) and/or on a side of the fire protection layer (10) facing away from the fiber material layer (8), in order to provide additional protection against fire.

Aspect 23. The layered composite according to any one of the preceding aspects, wherein the composite material (11, 12) fills recesses on the outer surface of the foam core (1), for example open pores and/or perforations, and/or intermediate spaces in the foam core (1), in order to reduce the resin absorption of the foam core (1) and/or to protect the foam core (1) from fire.

Aspect 24. The layered composite according to any one of the preceding aspects, comprising one or more intermediate layers made of solid-material micro-bodies which each have a greatest extent of 0.5 to 1.5 mm, in order to prevent or impede projectiles and/or splinters from penetrating in.

Aspect 25. The layered composite according to the preceding aspect, wherein the solid-material micro-bodies are spheres and/or the solid material is solid ceramics.

Aspect 26. The layered composite according to any one of the preceding aspects, wherein the plastic material (11) of the composite material (10) is mixed with metal oxide particles (13), for example zinc oxide particles (13), in order to provide protection against electromagnetic interference pulses, wherein the metal oxide particles (13) are at least 20 nm and at most 250 nm in size.

Aspect 27. The layered composite according to any one of the preceding aspects, wherein at least some of the hollow micro-bodies (12) of the composite material (10) are coated with metal in order to obtain protection against electromagnetic interference pulses in addition to fire protection.

Aspect 28. The layered composite according to any one of the preceding aspects, wherein the plastic foam of the foam core (1) and/or the plastic resin (5) is/are provided with one or more different fire protection additives.

Aspect 29. The layered composite according to any one of the preceding aspects, wherein the fiber material layer (8) contains at least some of the reinforcement fibers as fiber fabric and/or fiber scrim and/or knitted fabric in one or more plies.

Aspect 30. The layered composite according to any one of the preceding aspects, wherein at least some of the reinforcement fibers of the fiber material layer (8) are glass fibers and/or carbon fibers and/or basalt fibers.

Aspect 31. A composite material (11, 12) which contains hollow micro-bodies (12) made of glass or ceramics in a plastic material (11) and which is used as a highly filled fire protection filler, preferably in combination with the layered composite according to any one of the preceding aspects.

BRIEF DESCRIPTION OF THE DRAWINGS

Example embodiments of the invention are described below on the basis of figures. Features disclosed by the example embodiments, each individually and in any combination of features, advantageously develop the subject matter of the claims and the embodiments described above as well as the aspects. There is shown:

DETAILED DESCRIPTION OF THE INVENTION

Figure 1:
FIG. 1 a layered composite in accordance with an aspect of the invention in an isometric view.

FIG. 1 shows a layered composite in accordance with an aspect of the invention in the form of a panel-shaped semi-finished product. The layered composite comprises a foam core 1 made of a plastic foam, for example foamed polyethylene terephthalate (PET). The foam core 1 is structured such that it is three-dimensionally deformable. The foam core 1 is a sheet structure having a structure which allows the foam core 1 to be deformed around axes located in the surface, such that the foam core 1 can for example be shaped into a tube or a shell which is curved around different axes, without any appreciable mechanical resistance. The foam core 1 is sub-divided into a multitude of material islands 2 which are arranged next to each other in the plan view and delineated from each other by material attenuations. Connecting bridges 3 remain in the region of the material attenuations, which can in particular be formed as breaches, wherein each of the material islands 2 is connected to all of the immediately adjacent material islands 2 by at least one and preferably only one connecting bridge 3 in each case.

The foam core 1 is arranged between a first cover layer 7 and a second cover layer 8 which cover the foam core 1 on a lower side and an upper side.

Figures 2, 3, 4:
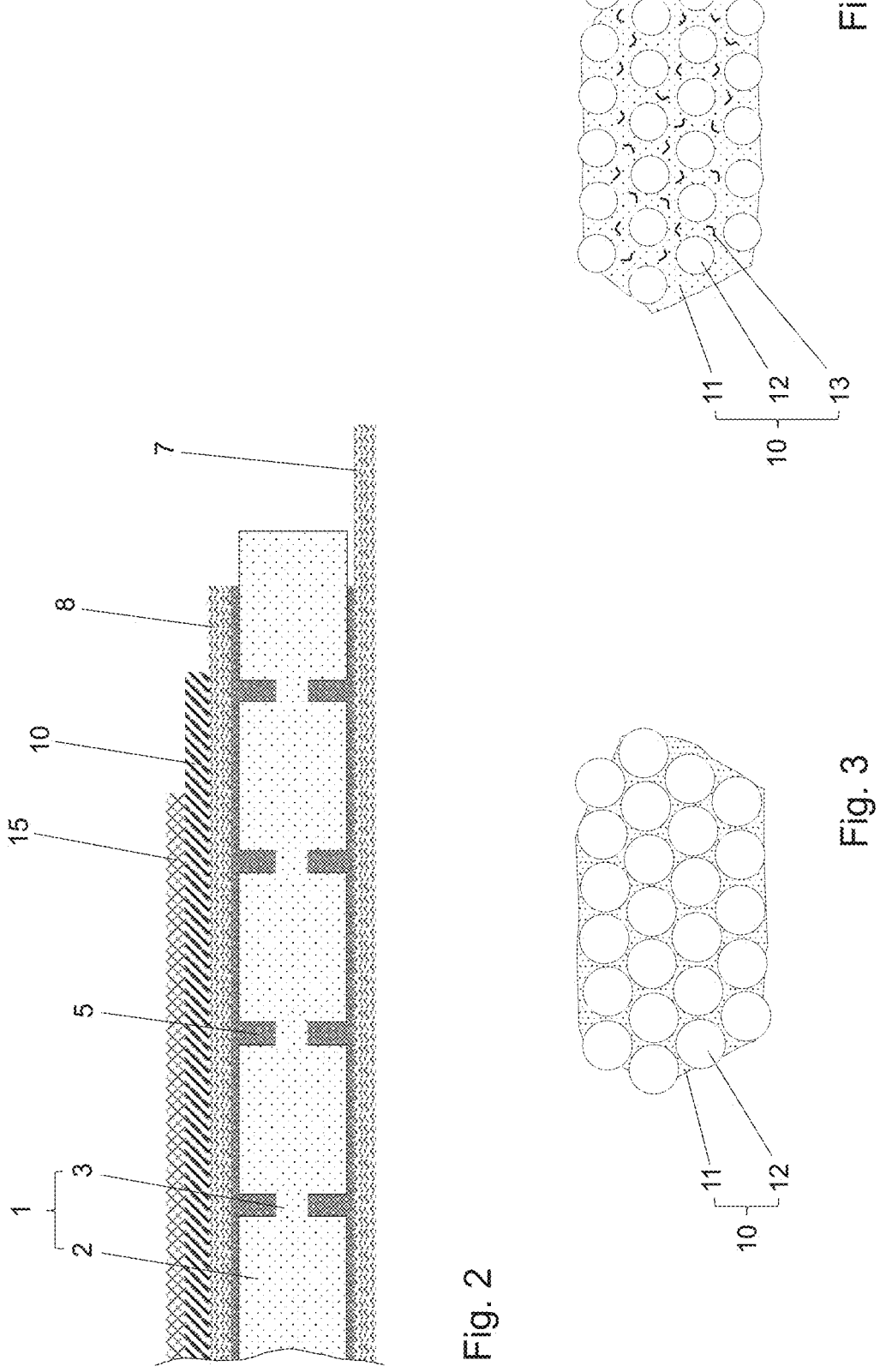
FIG. 2 the layered composite in a cross-section.
FIG. 3 a region of a fire protection layer of the layered composite in a schematic representation.
FIG. 4 a region of a modified fire protection layer in a schematic representation.

FIG. 2 shows the layered composite in a section which is orthogonal with respect to the cover layers 7 and 8. The section extends through the material islands 2 and the connecting bridges 3 of the foam core 1. The cavities which remain between the cover layers 7 and 8 in the region of the foam core 1 and delineate respectively adjacent material islands 2 from each other but are bridged by the connecting bridges 3 are filled with a plastic resin 5. The plastic resin 5 also covers at least regions of the lower side and the upper side of the foam core 1, where it forms a thin resin layer in the transition from the foam core 1 to the respective cover layer 7 or 8. The plastic resin 5 connects the cover layers 7 and 8 in a material bond, wherein it fills or permeates the foam core 1 in the region of the cavities or otherwise configured material attenuations (FIG. 1). The plastic resin 5 forms a resin matrix which encloses the material islands 2 laterally and preferably also on their lower side and upper side.

The foam core 1 forms a base sandwich structure with the cover layers 7 and 8 and the connecting plastic resin 5. The base sandwich structure 1, 5, 7, 8 can itself form the mechanical framework for a lightweight structure, for example a lightweight panel or a lightweight shell structure, and in this function can absorb the static and/or dynamic loads of the lightweight structure.

As shown in FIGS. 1 and 2, the layered composite exhibits a fire protection layer 10 on a side of the cover layer 8 facing away from the foam core 1. The fire protection layer 10 consists of a composite material. The composite material can be applied directly to the cover layer 8. Alternatively, it is also possible to firstly apply an expediently thin intermediate layer, for example a gelcoat layer, to the cover layer 8 and to apply the composite material to this intermediate layer. The composite material can for example be sputtered, sprayed or applied by means of a roller onto the cover layer 8 or an optional intermediate layer.

FIGS. 1 and 2 indicate how the layered composite can exhibit an intumescent layer 15 on the side of the fire protection layer 10 facing away from the foam core 1, further outwards as viewed from the foam core 1. The intumescent layer 15 can be provided in addition to or instead of the optional intermediate layer. It can in particular be a gelcoat layer. The intumescent layer 15 and/or the optional intermediate layer can for example serve to improve fire protection and/or as mechanical protection for the fire protection layer 10 and/or the base sandwich structure 1, 5, 7, 8 below it.

FIG. 3 shows a small region of the fire protection layer 10 in a significant enlargement. The fire protection layer 10 consists of the composite material which consists of a plastic material 11 as a support or matrix and hollow micro-bodies 12 made of glass or a ceramic material distributed in the plastic material 11. Although the hollow micro-bodies 12 can in principle exhibit any shape, for example an elongated oval shape, they are expediently hollow micro-spheres. Suitable hollow micro-spheres made of glass are for example available from 3M Corporation (Minnesota, USA).

At least 80% by mass or at least 90% by mass of the hollow micro-bodies 12 have an outer extent of at most 120 $\mu$m. More preferably, at least 80% by mass or at least 90% by mass have an outer extent of at most 110 $\mu$m or at most 100 $\mu$m. It is advantageous for at least 80% by mass or at least 90% by mass of the hollow micro-bodies 12 to have an outer extent of at least 20 $\mu$m. More preferably, at least 80% by mass of the hollow micro-bodies 12 have a greatest outer extent of at least 30 $\mu$m. If the hollow micro-bodies 12 are hollow micro-spheres, as in the example embodiment, the "outer extent" is the outer diameter of the hollow micro-spheres. By selecting the hollow micro-bodies 12 from the size range mentioned, a composite material having a low density on the one hand and a sufficient compressive strength of the hollow micro-bodies 12 on the other is obtained.

The plastic material 11 is at least substantially a polymer phase, wherein the polymer phase can consist of a single polymer or a combination of multiple polymers, including copolymers and polymer blends. The plastic material 11 can contain additives, for example mere fillers and/or functional additives, in particular fire protection additives and/or for example additives for shock absorption or another mechanical property and/or for improving or achieving electromagnetic shielding properties. The polymer phase, i.e. the solely polymeric ingredients, constitute at least 80% by mass or at least 85% by mass or at least 90% by mass of the plastic material 11. The one or more different additives provide the optionally remaining proportion by mass.

FIG. 4 likewise shows a small region of a fire protection layer 10 made of a modified composite material. The modi-fied composite material differs from the composite material described above in that its plastic material 11 contains metal oxide particles 13, for example zinc oxide particles. The metal oxide particles 13 have outer dimensions in the range of 20 nm to 250 nm and serve to achieve or improve an electromagnetic shielding effect. The statements made with respect to the composite material of FIG. 3 otherwise apply, such as for example the statements made with respect to the upper limit for the proportion by mass of additives.

An epoxy resin having a density of between 1.17 g/ccm and 1.25 g/ccm can for example be used as the plastic material 11 for the fire protection layer 10. This plastic material 11 is mixed with hollow micro-spheres 12 having diameters in the range of 20 $\mu$m to 120 $\mu$m. Preferably, at least 80% by mass of the hollow micro-spheres 12 have a diameter of at most 110 $\mu$m or at most 100 $\mu$m.

The viscosity of the plastic material 11 is set to be low enough that the hollow micro-spheres 12 are completely wetted on their outer surfaces and densely packed once mixed, and the intermediate spaces remaining between the hollow micro-spheres 12 are uniformly filled with the plastic material 11. By selecting the material (polymer phase with optional additive or additives) and/or the temperature, the viscosity is also set such that the composite material, i.e. the mixture of the plastic material 11 and the hollow micro-spheres 12, can be uniformly applied by sputtering, brushing, rollering or the like.

In advantageous embodiments, the hollow micro-bodies 12 have a density of less than 0.4 g/ccm or less than 0.3 g/ccm, preferably even less than 0.2 g/ccm. In the mixture and also in the finished layered composite, i.e. when the fire protection layer 10 is solid, the fire protection layer 10 contains a proportion by volume of at least 60% or at least 70% of the hollow micro-bodies 12, and the plastic material 11 constitutes the respectively residual proportion by volume.

If the plastic material 11 does not contain any additives, the composite material and therefore the finished fire protection layer 10 will have a density of 0.74 g/ccm (0.6·0.4 g/ccm+0.4·1.25 g/ccm) on the basis of the values mentioned for the combination which is least favorable for weight. If, by contrast, the composition is selected to exhibit the mixing ratio and lower densities which are more favorable for the lowest possible weight, the composite material or the fire protection layer 10 consisting of it has a density of 0.49 g/ccm (0.7·0.2 g/ccm+0.3·1.17 g/ccm). If, as is preferred, the proportion by volume of the hollow micro-bodies 12 is increased to over 70%, the density of the composite material then formed decreases even further.

If, by contrast, additives are added to the polymer phase of the plastic material 11, for example 15% by mass of a phosphoric fire protection additive which typically exhibits a density of at most 1.82 g/ccm, the composite material has a density of slightly more than 0.77 g/ccm (0.6·0.4 g/ccm+0.4·(0.85·1.25+0.15·1.82) g/ccm), i.e. still below 0.8 g/ccm.

The invention claimed is:

1. A layered composite, comprising:
a foam core made of a plastic foam;
a first cover layer and a second cover layer, between which the foam core is arranged, wherein at least one of the cover layers is a fiber material layer containing reinforcement fibers embedded in plastic;
a plastic resin which fills intermediate spaces between the cover layers in and around the foam core and holds the cover layers and the foam core together; and a fire protection layer made of a composite material on a side of the fiber material layer facing away from the foam core, wherein the composite material contains hollow micro-bodies made of ceramics or glass in a plastic material.

2. The layered composite according to claim 1, wherein the composite material has a density of at most 0.8 g/ccm or at most 0.6 g/ccm.

3. The layered composite according to claim 1, wherein at least 80% by mass of the plastic material of the composite material consists of a polymer phase having a density of at most 1.5 g/ccm or at most 1.3 g/ccm.

4. The layered composite according to claim 1, wherein the hollow micro-bodies have a density of at most 0.4 g/ccm or at most 0.3 g/ccm.

5. The layered composite according to claim 1, wherein a proportion by mass of at least 80% of the hollow micro-bodies exhibits a greatest outer extent of at most 120 µm and at least 20 µm.

6. The layered composite according to claim 1, wherein a proportion by volume of the hollow micro-bodies of the composite material is larger than a proportion by volume of the plastic material of the composite material.

7. The layered composite according to claim 1, wherein the composite material has a lower density than the plastic resin which holds the foam core and the cover layers together.

8. The layered composite according to claim 1, wherein the plastic resin which holds the foam core and the fiber material layer together has a density of at most 1.5 g/ccm or at most 1.3 g/ccm.

9. The layered composite according to claim 1, wherein the fire protection layer has a thickness of at most 2 mm or at most 1.5 mm.

10. The layered composite according to claim 1, wherein at least 80% by mass of the plastic material of the composite material consists of a polymer phase which is or contains an epoxy resin or a vinyl ester resin or a saturated polyester resin or an unsaturated polyester resin or a bio-based polyphenol resin or an epoxy vitrimer or a mixture of two or more of these polymers.

11. The layered composite according to claim 1, wherein at least 80% by mass of the plastic material of the composite material consists of a polymer phase which contains or is a bio-based polymer material.

12. The layered composite according to claim 11, wherein the bio-based polymer material is a bio-based polyphenol resin and/or a bio-based epoxy vitrimer.

13. The layered composite according to claim 1, wherein a proportion by mass of at least 0.1% and at most 20% of the plastic material of the composite material, relative to the mass of the plastic material of the fire protection layer, contains fire protection additives.

14. The layered composite according to claim 1, wherein the composite material fills recesses on the outer surface of the foam core and/or intermediate spaces in the foam core, in order to reduce the resin absorption of the foam core and/or to protect the foam core from fire.

15. The layered composite according to claim 14, wherein the composite material fills open pores and/or perforations on the outer surface of the foam core.

16. The layered composite according to claim 1, wherein the plastic material of the composite material is mixed with metal oxide particles in order to provide protection against electromagnetic interference pulses, wherein the metal oxide particles are at least 20 nm and at most 250 nm in size.

17. The layered composite according to claim 1, wherein the reinforcement fibers embedded in plastic are in the form of one or more plies of a textile sheet structure.

18. The layered composite according to claim 1, wherein the plastic material of the composite material is mixed with metal oxide particles including zinc oxide particles, in order to provide protection against electromagnetic interference pulses, wherein the metal oxide particles are at least 20 nm and at most 250 nm in size.

19. A fire protection filler, which is a composite material containing hollow micro-bodies made of glass or ceramics in a plastic material, wherein (a) a proportion by volume of the hollow micro-bodies of the composite material is larger than a proportion by volume of the plastic material of the composite material, (b) the hollow micro-bodies have a density of at most 0.2 g/ccm, and (c) at least 80% by mass of the plastic material of the composite material consists of a polymer phase which is or contains a vinyl ester resin or a saturated polyester resin or an unsaturated polyester resin or a mixture of two or more of these polymers.

\* \* \* \* \*